US008563109B2

(12) United States Patent
Ek et al.

(10) Patent No.: US 8,563,109 B2
(45) Date of Patent: Oct. 22, 2013

(54) PRESSURELESS POLYMER PIPE, A COMPOSITON THEREFORE, AND A PROCESS FOR PREPARING IT

(75) Inventors: Carl-Gustaf Ek, Västra Frölunda (SE); Bo Malm, Espoo (FI); Olli Tuominen, Helsinki (FI)

(73) Assignee: Borealis Technology Oy, Porvoo (FI)

( * ) Notice: Subject to any disclaimer, the term of this patent is extended or adjusted under 35 U.S.C. 154(b) by 1179 days.

(21) Appl. No.: 11/661,574

(22) PCT Filed: Aug. 30, 2005

(86) PCT No.: PCT/EP2005/009341
§ 371 (c)(1),
(2), (4) Date: Aug. 30, 2007

(87) PCT Pub. No.: WO2006/024496
PCT Pub. Date: Mar. 9, 2006

(65) Prior Publication Data
US 2011/0123745 A1    May 26, 2011

(30) Foreign Application Priority Data

Sep. 2, 2004  (EP) .................................... 04445088

(51) Int. Cl.
*B32B 1/08*       (2006.01)
*C08L 23/14*      (2006.01)
*C08L 23/16*      (2006.01)
*C08L 23/20*      (2006.01)

(52) U.S. Cl.
USPC ............. 428/36.9; 525/240; 525/52; 524/528

(58) Field of Classification Search
USPC .................... 428/36.9; 525/240, 52; 524/528
See application file for complete search history.

(56) References Cited

U.S. PATENT DOCUMENTS

| 5,962,595 | A   |   | 10/1999 | Dolle et al. |
| 6,084,041 | A   | * | 7/2000  | Andtsjo et al. .................. 526/64 |
| 6,433,087 | B1  | * | 8/2002  | Ebner et al. .................... 525/191 |
| 6,503,993 | B1  | * | 1/2003  | Huovinen et al. .......... 526/348.1 |
| 2004/0116607 | A1 | * | 6/2004 | Malm et al. .................... 525/240 |

FOREIGN PATENT DOCUMENTS

| CN | 1237984 A    | 12/1999 |
| EP | 0791609      | 8/1997  |
| EP | 0 808 870 A2 | 11/1997 |
| EP | 0591224      | 2/1998  |
| EP | 0877039      | 11/1998 |
| EP | 1028985      | 4/2003  |
| WO | WO 97/13790  | 4/1997  |
| WO | WO 98/22514 A1 | 5/1998 |
| WO | WO 99/35430  | 7/1999  |
| WO | WO 03/097731 A1 | 11/2003 |

OTHER PUBLICATIONS

Chinese Office Action for corresponding Chinese Patent Application No. 200580029658.4 dated Apr. 19, 2010.
Chinese Office Action for corresponding Chinese Patent Application No. 200580029658.4 dated Aug. 30, 2010.
Heino, E. "The influence of molecular structure on some rheological properties of polyethylene", Annual Transactions of the Nordic Rheology Society, vol. 3, 1995, pp. 71-73.
Heino et al. "Rheological Characterization of Polyehtylene Fractions." *Theoretical and Applied Rheology*. (1992), pp. 360-362).
*Encyclopedia of Polymer Science and Engineering*, Second Edition. vol. 6, Nov. 1986, p. 545-558.
Czaja, K. et al. "Two-step polymerization of propylene over $MgCl_2$-supported titanium catalyst", Macromol. Chem. Phys., vol. 199, 1998, pp. 451-455.
Samson, J. et al. "Gas-Phase Polymerization of Propylene with a Highly Active Ziegler-Natta Catalyst", AIChE Journal, vol. 45, No. 7, Jul. 1999, pp. 1548-1558.
Pater, J. et al. "Propene Bulk Polymerization Kinetics: Role of Prepolymerization and Hydrogen", AIChE Journal, vol. 49, vo. 1, Jan. 2003, pp. 180-193.

* cited by examiner

*Primary Examiner* — Michael M Bernshteyn
(74) *Attorney, Agent, or Firm* — Merchant & Gould P.C.

(57) ABSTRACT

A pressureless polymer pipe, a composition therefore, and a process of preparing the composition are described. The pipe is characterized in that the polymer comprises a propylene polymer composition where the propylene base polymer is a heterophasic propylene copolymer having a matrix of a propylene homopolymer and a dispersed phase of an elastomeric copolymer of propylene and at least one olefin comonomer; has a comonomer content of 2-7% by weight, based on the weight of the heterophasic propylene copolymer; has a melt flow rate MFR (2/230), determined according to ISO 1133 C4, of 0.1-2.0 g/10 min; has a broad molecular weight distribution as defined by its rheology shear thinning index, $SHI_{0/50}$, measured at 200° C. of 9-30; has a tensile modulus, determined according to ISO 527-2/1B at 1 mm/min and 23° C. of at least 1800 MPa; has an impact strength, determined according to ISO 179/1 eA of at least 6 $kJ/m^2$ at 0° C. and at least 2 $kJ/m^2$ at −20° C. The composition is a polymer composition as defined above. The process is characterized by polymerizing in the presence of a stereospecific Ziegler-Natta catalyst including an electron donor:(i) a propylene homopolymer matrix in at least one loop reactor at a temperature of at least 80° C. and a pressure of 4600-10000 kPa; and (ii) an elastomeric copolymer of propylene and at least one olefin comonomer in at least one gas-phase reactor at a lower temperature than in stage (i); to obtain a base polymer of heterophasic propylene copolymer as defined above.

21 Claims, No Drawings

PRESSURELESS POLYMER PIPE, A COMPOSITON THEREFORE, AND A PROCESS FOR PREPARING IT

FIELD OF THE INVENTION

The present invention relates to a pressureless polymer pipe, to a polymer composition for such a pipe, and to a process of preparing a polymer composition for such a pipe.

TECHNICAL BACKGROUND

Pipes of polymer material are frequently used for various purposes, such as fluid transport, i.e. transport of gases or liquids. The fluid may be pressurised such as when transporting natural gas or tap water, or not pressurised such as when transporting sewage (waste-water), drainage (land and road drainage), for storm water applications or for indoor soil and waste. More-over, the transported fluid may have varying temperature, usually within the temperature range from about 0° C. to about 50° C. Pressureless (non-pressure) pipes may also be used for cable and pipe protection.

Such pressureless pipes are herein also referred to interchangeably as sewage pipes and pressureless sewage pipes.

The term "pipe" as used herein is meant to comprise pipes in a broader sense, as well as supplementary parts like fittings, valves, chambers and all parts which are commonly necessary for e.g. a sewage piping system.

Pipes according to the present invention comprise single or multilayer pipes, where for example one or more of the layers is a metal layer and which may include an adhesive layer. Structural-wall pipes, such as corrugated pipes, double-wall pipes with or without hollow sections, are also comprised by the present invention.

Different requirements are imposed on pipes for the transport of pressurised fluids (so-called pressure pipes) and pipes for the transport of non-pressurised fluids such as sewage (so-called pressureless pipes). While pressure pipes must be able to withstand an internal positive pressure, i.e. a pressure inside the pipe that is higher than the pressure outside the pipe, pressureless pipes do not have to withstand any internal positive pressure, but are instead required to withstand an external positive pressure, i.e. the pressure outside the pipe is higher than the pressure inside the pipe. This higher outside pressure may be due to the earth load on the pipe when submerged in the soil, the groundwater pressure, traffic load, or clamping forces in indoor applications. There is thus a clear distinction between pressure pipes on the one hand and pressureless pipes on the other hand. As mentioned above, the present invention relates to pressureless pipes.

With regard to prior art relating to propylene polymers and pipes of polypropylene the following references may be mentioned.

EP 1 028 985 relates to nucleated propylene homo- and copolymers e.g. for tubes, pipes and fittings. The propylene polymer is prepared by polymerization in the presence of a catalyst system primarily transesterified with a phtalic acid ester—a lower alcohol pair and comprising a donor and a polymerized vinyl compound such as vinyl cyclohexane (VCH) as a nucleating agent.

WO 97/13790 relates to a process of making propylene polymers or copolymers in propylene medium at super-critical temperature and pressure conditions.

EP 0 808 870 relates to a high molecular weight reactor blend of polypropylene and an ethylene-propylene copolymer with an ethylene content of 0.1-2% by weight. The blend has a MFR (5/230) of at most 5 dg/min and a broad molecular weight distribution ($M_w/M_n$) of 6-20.

EP 0 791 609 relates to a high molecular weight polypropylene with broad molecular weight distribution. The polypropylene is a high molecular weight copolymer of ethylene and propylene with 1-10% of ethylene and a MFR (5/230) of less than 5 dg/min and a $M_w/M_n$ of 6-20.

WO 99/35430 (=U.S. Pat. No. 6,433,087) relates to a heterophasic propylene copolymer with a propylene homopolymer matrix and an ethylene-propylene copolymer as a dispersed elastomeric component. The heterophasic propylene copolymer has a tensile modulus of 1300-2300 N/mm$^2$ and an impact strength at 23° C. of 60-110 kJ/m$^2$.

EP 0 877 039 relates to a reactor blend of a propylene homopolymer and an ethylene-propylene copolymer which may be used as moulding composition for automotive parts such as bumpers, instrument panels and the like. The reactor blend has an ethylene content of 0.5-25% by weight, a MFR (5/30) of at least 5 dg/min, and the copolymer comprises 13-40% by weight of ethylene repeating units.

Pressureless pipes such as sewage pipes are made in a variety of dimensions from about 0.1 to about 3 m diameter and of a variety of materials such as ceramics (vitrified clay mainly), concrete, polyvinyl chloride (PVC), polyethylene (PE), and polypropylene (PP). While ceramics and concrete are low-cost materials, they are unfortunately heavy and brittle. There has therefore been a trend during recent years to replace sewage pipes of ceramics or concrete with pipes of polymer materials such as PVC, PE or PP. While PVC costs less than PP per unit weight, PP has advantages over PVC in other respects by having a lower density and thus a lower weight per metre pipe, having superior high and low temperature properties, and being weldable.

Sewage pipes of PP must show sufficient stiffness to withstand the earth load without any help from internal pressure. The stiffness of the pipe is derived primarily from the pipe material and as a measure of the stiffness may be taken the elasticity modulus (or modulus for short) of the pipe material. The higher the modulus of the pipe material, the stiffer the pipe will be. The stiffness of the pipe may be further enhanced by the design of the pipe wall, e.g. by corrugating the pipe.

Further, pressureless pipes are often exposed to high as well as low temperatures. They must therefore be durable within a wide range of temperatures which means that they should display a high impact strength, particularly at low temperatures.

The pipe should not be brittle, because if it is too brittle the pipe will fail due to brittle cracking. A measure of the brittleness of the pipe is its resistance to slow crack growth. The higher the resistance to slow crack growth, the better.

When a material with a higher modulus is used a thinner pipe wall may be used while obtaining the same or higher (ring) stiffness as a lower modulus pipe with a thicker pipe wall.

Thinner pipe walls are more sensitive to cracks since any damage or notch on the pipe surface will propagate easier through the pipe wall. Structured-wall pipes (corrugated, ribbed, twin-wall pipes, etc.) are most sensitive to cracks and the slow crack growth properties of the material since the structured pipe design often consists of thin sections.

Structured-wall pipes includes for example single-layer corrugated pipes, ribbed pipes, twin-wall pipes with hollow sections, multilayer pipes with or without hollow sections or foamed layers, and spirally wound pipes with or without hollow sections with smooth or corrugated pipe design.

Basically, pipes with thin sections, either smooth solid-wall pipes of smaller diameters or structured-wall pipes with thin sections are more sensitive to cracks. Due to the high and 3-dimensional structure of structured-wall pipes also the stresses are locally higher when subject to external load conditions compared to smooth solid-wall pipes, i.e. larger sensitivity to cracks.

When using materials with higher stiffness, the stress in the pipe wall will be higher when buried under ground due to the higher load bearing capability of the pipe and the constant deflection condition.

The stiffness and brittleness are two contradictory properties. Accordingly, the stiffer a pipe is, the more brittle it will normally be. Thus, a high modulus is usually accompanied by a low resistance to slow crack growth.

In view hereof there is a need for an improved pressureless pipe of a polymer material that combines a high stiffness, a high impact strength, and preferably also a low brittleness, i.e. the pipe should have a high modulus, be durable especially at low temperatures, and have a high resistance to slow crack growth.

SUMMARY OF THE INVENTION

It is an object of the present invention to provide a pressureless polymer pipe that combines a high stiffness and a low brittleness, i.e. has a high modulus and a high impact strength at low temperatures.

It is a further object of the present invention to provide a pressureless polymer pipe that has a high resistance to slow crack growth.

It is another object of the present invention to provide a polymer composition for such a pressureless pipe.

It is still another object of the present invention to provide a process of preparing a polymer composition for such a pressureless pipe.

The present invention thus provides a pressureless polymer pipe, characterised in that the polymer comprises a propylene polymer composition where the propylene base polymer is a heterophasic propylene copolymer having a matrix of a propylene homopolymer and a dispersed phase of an elastomeric copolymer of propylene and at least one olefin comonomer;

has a comonomer content of 2-7% by weight, based on the weight of the heterophasic propylene copolymer;

has a melt flow rate MFR (2/230), determined according to ISO 1133 C4, of 0.1-2.0 g/10 min;

has a broad molecular weight distribution as defined by its rheology shear thinning index, $SHI_{0/50}$, measured at 200° C. of 9-30;

has a tensile modulus, determined according to ISO 527-2/1B at 1 mm/min and 23° C. of at least 1800 MPa;

has an impact strength, determined according to ISO 179/1 eA of at least 6 kJ/m$^2$ at 0° C. and at least 2 kJ/m$^2$ at –20° C.

The present invention further provides a propylene polymer composition for a pressureless polymer pipe, characterised in that the propylene base polymer is a heterophasic propylene copolymer comprising a matrix of a propylene homopolymer and a dispersed phase of an elastomeric copolymer of propylene and at least one olefin comonomer;

has a comonomer content of 2-7% by weight, based on the weight of the heterophasic propylene copolymer;

has a melt flow rate MFR (2/230), determined according to ISO 1133 C4, of 0.1-2.0 g/10 min;

has molecular weight distribution as defined by its rheology shear thinning index, $SHI_{0/50}$, measured at 200° C. of 9-30;

has a tensile modulus, determined according to ISO 527-2/1B at 1 mm/min and 23° C. of at least 1800 MPa;

has an impact strength, determined according to ISO 179/1 eA of at least 6 kJ/m$^2$ at 0° C. and at least 2 kJ/m$^2$ at –20° C.

The present invention still further provides a process of preparing a polymer composition for a pressureless polymer pipe, characterised by polymerizing in the presence of a stereospecific Ziegler-Natta catalyst including an electron donor:

(i) a propylene homopolymer matrix in at least one loop reactor at a temperature of at least 80° C. and a pressure of 4600-10000 kPa; and (ii) an elastomeric copolymer of propylene and at least one olefin comonomer in at least one gas-phase reactor at a lower temperature than in stage (i);

to obtain a base polymer of heterophasic propylene copolymer comprising a matrix of said propylene homopolymer and a dispersed phase of said elastomeric propylene copolymer; said heterophasic propylene copolymer having a comonomer content of 2-7% by weight, based on the weight of the heterophasic propylene copolymer;

a melt flow rate MFR (2/230), determined according to ISO 1133 C4, of 0.1-2.0 g/10 min;

a molecular weight distribution as defined by its rheology shear thinning index, $SHI_{0/50}$, measured at 200° C. of 9-30;

a tensile modulus, determined according to ISO 527-2/1B at 1 mm/min and 23° C. of at least 1800 MPa; and an impact strength, determined according to ISO 179/1 eA of at least 6 kJ/m$^2$ at 0° C. and at least 2 kJ/m$^2$ at –20° C.

Further distinctive features and advantages of the present invention will appear from the following description and the appended claims.

DETAILED DESCRIPTION OF THE INVENTION

As stated above, an important property of the pipe and polymer composition of the present invention is its elasticity modulus (or modulus for short). By the elasticity modulus mentioned herein is meant the tensile modulus determined on 4 mm thick test specimens according to ISO 527-2/1B at 1 mm/min and 23° C. The compression moulded test specimens are made in a positive mould according to ISO 1873-2. As stated earlier, the modulus of the propylene polymer of the present invention is at least 1800 MPa for the base polymer (i.e. the polymer composition as such (with only process and heat stabilization) without adjuvants, such as other additives, fillers and reinforcing agents). Preferably the modulus is at least 1900 MPa. Further, it is preferred that the modulus lies in the range 1800-2500 MPa, more preferably 1850-2100 MPa. These values indicate a very high stiffness and should be compared with a modulus of prior art PP materials of generally at most about 1700 MPa.

A property of the polymer pipe related to its modulus is the pipe ring stiffness. The ring stiffness is determined according to EN ISO 9969.

The ring stiffness determined according to EN ISO 9969 for a pipe having a diameter of 110 mm and a wall thickness of 4 mm at 23° C. is related to the E modulus according to formula (I):

$$E = \text{Ring stiffness} \times 12 \times [(D-t)/t]^3 \quad (I)$$

where
E is the elasticity modulus in MPa,
D is the outer diameter of the pipe in mm, and
t is the wall thickness of the pipe in mm.

The diameter is measured as follows: The outer diameter of the pipe is measured with a "Circumference tape" at three different points with an accuracy of 0.1 mm. The mean value of the three measurements is calculated and the result given in mm with one decimal.

The wall thickness is measured at six points equally spaced with 60 degrees between them and with an accuracy of 0.01 mm. The mean value of the six measurements is calculated and the result given in mm with three decimals.

The E modulus calculated from the ring stiffness measurement is often a better method to evaluate the stiffness of the material intended for pipe applications since the ring stiffness is the final stiffness/modulus property which is of importance for the final application. By using the ring stiffness value for calculation of the material stiffness, the influence of the pipe form and the processing conditions (conventional pipe extrusion) are also included in the values measured, i.e. giving values appropriate for the application.

At the present invention the E modulus calculated from the ring stiffness measurement should preferably also have a value of at least 1800 MPa, more preferably at least 1900 MPa.

Another important property of the pipe and polymer composition of the present invention is its impact strength, particularly at low temperatures. The impact strength is determined in accordance with ISO 179/1 eA using compression moulded test specimens as described in EN ISO 1873-2 (80× 10×4 mm). The impact strength at 0° C. is at least 6 kJ/m$^2$, preferably at least 7 kJ/m$^2$. The impact strength at −20° C. is at least 2 kJ/m$^2$, preferably at least 4 kJ/m$^2$.

Another way of defining the impact strength of the polymer pipe according to the present invention is the so-called falling weight impact, determined according to EN 1411. According to EN 1411 the H$_{50}$ value (the height where 50% of the samples fail) for a pipe with an outer diameter of 110 mm and a wall thickness of 4 mm and using a 4 kg striker should be at least 1 m with maximum 1 break below 0.5 m at 0° C. The pipe according to the invention typically has a far better falling weight impact property with a H$_{50}$ value of at least 1 m, more preferred at least 2 m, most preferred at least 4 m at the much lower temperature −20° C.

Although the present invention relates to pressureless or non-pressurised pipes, it is desired that the polymer pipe of the present invention should have a good resistance to internal pressure. Preferably, the polymer pipe of the present invention has a pressure resistance well above the requirement according to EN 1852 (including EN 1852-1/A1). Thus, the polymer pipe of the present invention preferably has a resistance to internal pressure of over 200 hrs, more preferably over 400 hrs at 4.2 MPa/80° C., and over 1500 hrs, more preferably over 2000 hrs at 2.5 MPa/95° C., determined according to EN 921 in water conditions on a 32 mm/3.0 mm or 110 mm/4.0 mm outer diameter/wall thickness pipe.

As mentioned earlier the polymer of the present invention is a heterophasic propylene copolymer or propylene impact copolymer (also known as propylene block copolymer or PP-B). This means that the propylene polymer has a multiphase structure with a homopolymer matrix and inclusions comprising elastomeric ("rubbery") propylene copolymer.

The homopolymer matrix consists exclusively or substantially exclusively of propylene repeating units. The homopolymer matrix is a unimodal or multimodal, preferably bimodal propylene homopolymer.

By the expression "substantially exclusively" used herein is meant that the propylene homopolymer may include up to at most about 1% by weight, preferably at most 0.5% by weight of repeating units derived from other monomer(s). Such other monomer(s) are selected from the group consisting of ethylene and C$_4$-C$_{10}$-α-olefins, preferably ethylene.

The expression "multimodal" used herein refers to the modality of the polymer, i.e. the form of its molecular weight distribution curve, which is the graph of the polymer weight fraction as function of its molecular weight. If the polymer is produced in a sequential step process, utilizing reactors coupled in series and using different conditions in each reactor, the different fractions produced in the different reactors will each have their own molecular weight distribution. When the molecular weight distribution curves from these fractions are superimposed into the molecular weight distribution curve for the total resulting polymer product, that curve may show two or more maxima or at least be distinctly broadened in comparison with the curves for the individual fractions. Such a polymer product, produced in two or more serial steps, is called bimodal or multimodal depending on the number of steps. In the following all polymers thus produced in two or more sequential steps are called "multimodal". It is to be noted here that also the chemical compositions of the fractions may be different.

The propylene homopolymer matrix of the present invention is a high isotacticity polymer with a tacticity of more than 98%, preferably more than 99%, as determined by FTIR. This high isotacticity results in a crystallinity (as measured by DSC) of more than 50%, preferably 52-53% for the matrix.

The other component of the heterophasic propylene copolymer, the elastomeric or rubbery propylene copolymer is a copolymer of propylene and at least one olefin comonomer selected from the group consisting of ethylene and C$_4$-C$_{10}$-α-olefins, preferably ethylene. The comonomer content is 2-7% by weight, preferably 3-4% by weight, based on the weight of the heterophasic propylene copolymer.

The propylene copolymer has a content of polymer solubles in xylene (XS) at 25° C. of 4-10% by weight, preferably 6-8% by weight, based on the weight of the propylene impact copolymer. The XS is measured by dissolving the polymer in xylene at 135° C., and allowing the solution to cool to 25° C. and filtering off the insoluble part.

Further, the propylene copolymer preferably has an amorphous content (AM), measured by separating the above xylene soluble fraction and precipitating the amorphous part with acetone, of 4-10% by weight and more preferably 5-8% by weight, based on the weight of the propylene impact copolymer.

The melt flow rate (MFR), determined according to ISO 1133 C4 at 230° C. and a load of 2.16 kg (MFR (2/230), of the heterophasic propylene copolymer is 0.1-2.0 g/10 min, preferably 0.1-1.5 g/10 min, more preferably 0.2-0.9 g/10 min, and most preferably 0.2-0.5 g/10 min.

The heterophasic propylene copolymer of the present invention has a broad molecular weight distribution as defined by its shear thinning index (SHI) measured at 200° C. by rheology. The SHI is the ratio of the complex viscosity (η*) at two different shear stresses and is a measure of the broadness (or narrowness) of the molecular weight distribution. According to the present invention the heterophasic propylene copolymer has a shear thinning index SHI$_{0/50}$, i.e. a ratio of the complex viscosity at 200° C. and a shear stress of 0 kPa (η*$_0$) and the complex viscosity at 200° C. and a shear stress of 50 kPa (η*$_{50}$), of 9-30, preferably 10-20.

For the determination of η*$_0$ dynamic rheological measurements were carried out with Rheometrics RDA-II QC on compression molded samples under nitrogen atmosphere at 200° C. using 25 mm-diameter plate and plate geometry. The oscillatory shear experiments were done with the linear viscoelastic range of strain at frequencies from 0.01 to 500 rad/s. (ISO6721-1).

The values of storage modulus (G'), loss modulus (G"), complex modulus (G*) and complex viscosity ($\eta^*$) were obtained as a function of frequency ($\omega$).

The Zero shear viscosity ($\eta_0$) was calculated using complex fluidity defined as the reciprocal of complex viscosity. The real and imaginary parts are thus defined by $$f'(\omega)=\eta'(\omega)/[\eta'(\omega)^2+\eta''(\omega)^2] \text{ and}$$

$$f''(\omega)=\eta''(\omega)/[\eta'(\omega)^2+\eta''(\omega)^2]$$

From the following equations $$\eta'=G''/\omega \text{ and } \eta''=G'/\omega$$

$$f'(\omega)=G''(\omega)\cdot\omega/[G'(\omega)^2+G''(\omega)^2]$$

$$f''(\omega)=G'(\omega)\cdot\omega/[G'(\omega)^2+G''(\omega)^2]$$

There is a linear correlation between f' and f" with zero ordinate value of $1/\eta_0$. ("Rheological characterization of polyethylene fractions". Heino, E. L.; Lehtinen, A.; Tanner, J.; Seppälä, J. Neste Oy, Porvoo, Finland. Theor. Appl. Rheol., Proc. Int. Congr. Rheol., 11$^{th}$ (1992), 1360-362.) For polypropylene this is valid at low frequencies and five first points (5 points/decade) are used in calculation of $\eta_0$.

Elasticity indexes (G') and shear thinning indexes (SHI), which are correlating with MWD and are independent of MW, were calculated according to "Rheological characterization of polyethylene fractions". Heino, E. L.; Lehtinen, A.; Tanner, J.; Seppälä, J. Neste Oy, Porvoo, Finland. Theor. Appl. Rheol., Proc. Int. Congr. Rheol., 11$^{th}$ (1992), 1360-362 and "The influence of molecular structure on some rheological properties of polyethylene" Heino, Eeva-Leena, Borealis Polymers Oy, Porvoo, Finland. Annual Transactions of the Nordic Rheology Society, 1995.

SHI is calculated by dividing the Zero Shear Viscosity by a complex viscosity value, obtained at a certain constant shear stress value, G*. The abbreviation, SHI (0/50), is the ratio between the zero shear viscosity and the viscosity at the shear stress of 50 000 Pa.

The density of the heterophasic propylene copolymer is 0.900-0.906 g/cm$^3$.

The present invention also comprises an improved process for the polymerization of a heterophasic propylene copolymer.

As a catalyst for the polymerization any stereospecific catalyst for propylene polymerization can be used, which is capable of catalysing polymerization and copolymerization of propylene and comonomers at a pressure of 500-10000 kPa, in particular 2500-8000 kPa, and at a temperature of 40-110° C., in particular 60-110° C. Preferably, the catalyst comprises a high-yield, Ziegler-Natta type catalyst which can be used at high polymerization temperatures of 80° C. or more.

Generally, the Ziegler-Natta catalyst used in the present invention comprises a catalyst component, a cocatalyst component, an external donor, the catalyst component of the catalyst system primarily containing magnesium, titanium, halogen and an internal donor. Electron donors control the stereospecific properties and/or improve the activity of the catalyst system. A number of electron donors including ethers, esters, polysilanes, polysiloxanes, and alkoxysilanes are known in the art.

The catalyst preferably contains a transition metal compound as a procatalyst component. The transition metal compound is selected from the group consisting of titanium compounds having an oxidation degree of 3 or 4, vanadium compounds, zirconium compounds, cobalt compounds, nickel compounds, tungsten compounds and rare earth metal compounds, titanium trichloride and titanium tetrachloride being particularly preferred.

It is preferable to use catalysts which can withstand the high temperatures prevailing in the loop reactor. The conventional Ziegler-Natta catalysts for isotactic polymerization of propylene generally have an operating temperature limit of around 80° C., above which they either become deactivated or lose their stereo-selectivity. This low polymerization temperature may put a practical limit on the heat removal efficiency of the loop reactor.

One preferred catalyst to be used according to the invention is disclosed in EP 591 224 which discloses a method for preparing a procatalyst composition from magnesium dichloride, a titanium compound, a lower alcohol and an ester of phthalic acid containing at least five carbon atoms. According to EP 591 224 a trans-esterification reaction is carried out at an elevated temperature between the lower alcohol and the phthalic acid ester, whereby the ester groups from the lower alcohol and the phthalic ester change places.

Magnesium dichloride can be used as such or it can be combined with silica, e.g. by absorbing the silica with a solution or slurry containing magnesium dichloride. The lower alcohol used may preferably be methanol or ethanol, particularly ethanol.

The titanium compound used in the preparation of the procatalyst is preferably an organic or inorganic titanium compound, which is at the oxidation state of 3 or 4. Also other transition metal compounds, such as vanadium, zirconium, chromium, molybdenum and tungsten compounds can be mixed with the titanium compound. The titanium compound usually is a halide or oxyhalide, an organic metal halide, or a purely metal organic compound in which only organic ligands have been attached to the transition metal. Particularly preferred are the titanium halides, especially titanium tetrachloride.

The alkoxy group of the phthalic acid ester used comprises at least five carbon atoms, preferably at least eight carbon atoms. Thus, as the ester may be used e.g. propylhexyl phthalate, dioctyl phthalate, di-isodecyl phthalate and ditridecyl phthalate. The molar ratio of phthalic acid ester and magnesium halide is preferably about 0.2:1.

The transesterification can be carried out, e.g. by selecting a phthalic acid ester—a lower alcohol pair, which spontaneously or by the aid of a catalyst, which does not damage the procatalyst composition, trans-esterifies the catalyst at an elevated temperature. It is preferred to carry out the transesterification at a temperature which is 110-150° C., preferably 120-140° C.

The catalyst can also be modified as described in EP 1 028 985.

The catalyst prepared by the method above is used together with an organometallic cocatalyst and with an external donor. Generally, the external donor has the formula

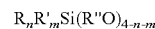

wherein
R and R' can be the same or different and represent a linear, branched or cyclic aliphatic, or aromatic group;
R" is methyl or ethyl;
n is an integer of 0 to 3;
M is an integer of 0 to 3; and
n+m is 1 to 3.

In particular, the external donor is selected from the group consisting of cyclohexyl methylmethoxy silane (CHMMS), dicyclopentyl dimethoxy silane (DCPDMS), diisopropyl dimethoxy silane, di-isobutyl dimethoxy silane, and di-t-butyl dimethoxy silane.

An organoaluminium compound is used as a cocatalyst. The organoaluminium compound is preferably selected from the group consisting of trialkyl aluminium, dialkyl aluminium chloride and alkyl aluminium sesquichloride.

According to the invention, such catalysts are typically introduced into the first reactor only. The components of the catalyst can be fed into the reactor separately or simultaneously or the components of the catalyst system can be precontacted prior to the reactor.

Such precontacting can also include a catalyst prepolymerization prior to feeding into the polymerization reactor proper. In the prepolymerization the catalyst components are contacted for a short period with a monomer before feeding to the reactor.

The polymerization process of the invention is divided into two main stages: one stage (i) of preparing the propylene homopolymer matrix, and another stage (ii) of preparing the elastomeric (rubbery) propylene-olefin comonomer copolymer. Stage (i) may preferably include a prepolymerization step before the polymerization proper of the propylene homopolymer matrix. The polymerization in the prepolymerization reactor is carried out with propylene, normally at a lower temperature than the main polymerization. Preferably all of the catalyst utilized in the polymerization process is added to the prepolymerization reactor.

After the prepolymerization the polymerization of the propylene homopolymer may be carried out in one step, but is preferably carried out in at least two steps in order to obtain a multimodal, preferably bimodal propylene homopolymer. The polymerization system of stage (i) can comprise one or more conventional loop reactors or one or more gas-phase reactors. Preferably, the reactors are selected among loop and gas-phase reactors and in particular stage (i) employs two loop reactors or one loop reactor and one gas-phase reactor in series. This is particularly suitable for producing bimodal polypropylene. By carrying out the polymerization in the different polymerization reactors in the presence of different amounts of hydrogen, the molecular weight distribution of the product can be broadened and its mechanical properties and processability improved. It is also possible to use several reactors of each type, e.g. one loop reactor and two or three gas-phase reactors or two loop reactors and one gas-phase reactor, in series.

Generally, the temperature of the loop reactor is at least 80° C. and the pressure is at least 4600-10000 kPa.

A particularly preferred embodiment of the invention comprises carrying out the polymerization of stage (i) in a process comprising loop and gas-phase reactors in a cascade where the loop reactor operates in liquid propylene and at a high polymerization temperature of at least 80° C., most preferably at supercritical temperature and pressure conditions. The second polymerization step is made in gas-phase reactor(s) in order to broaden the molecular weight distribution of the polymer of stage (i).

The term "supercritical" conditions means that both the temperature and the pressure in the reactor are above the corresponding supercritical temperature and pressure of the reaction medium. For a reaction medium of propylene this means a temperature of at least 92° C. and a pressure of at least 4600 kPa. The ultimate upper limit of the temperature is the melting point of the resulting polymer, but unnecessarily high temperatures cause an increase in the solubility of the polymer. Preferred temperatures are therefore in the range 92-110° C. and particularly at most 100° C. Preferred pressures are in the range 4600-10000 kPa, more preferably 5000-7000 kPa.

The subsequent polymerization in the gas-phase reactor(s) of stage (i) is carried out at a temperature of 50-115° C., preferably 60-110° C., more preferably 80-105° C. and a pressure of 500-5000 kPa, preferably 1500-3500 kPa. Preferably, when the loop polymerization step of stage (i) is carried out at surpercritical conditions the temperature of the gas-phase reactor is 85-95° C. and the pressure is 2000-3000 kPa.

The production ratio by weight (the so-called "split") between the loop reactor and the gas-phase reactor of stage (i) is 20:80 to 80:20, preferably 30:70 to 70:30, more preferably 40:60 to 60:40.

As has been mentioned earlier, the homopolymer matrix consists exclusively or substantially exclusively of propylene repeating units. This means that it is possible, although not preferred, to add small amounts of comonomers selected from the group consisting of ethylene and/or $C_4$-$C_{10}$-$\alpha$-olefins, such as ethylene, butene, pentene, hexane and the like, and preferably ethylene, to the polymerization reactor(s) of stage (i).

The gas-phase reactor(s) of stage (i) may be an ordinary fluidised bed reactor, although other types of gas-phase reactors can be used. In a fluidised bed reactor the bed consists of the formed and growing polymer particles as well as still active catalyst that is brought along with the polymer fraction. The bed is kept in a fluidised state by introducing gaseous components, for instance monomer, at such a flowing rate that will make the particles act as a fluid. The fluidising gas may also contain inert carrier gases, like nitrogen, and also hydrogen as a modifier. The fluidised gas-phase reactor may be equipped with a mechanical mixer.

The above process allows the preparation of a propylene homopolymer matrix having high stiffness and an increased overall degree of crystallization. The degree of crystallization measured by DSC (differential scanning calorimeter) of the propylene homopolymer matrix generally is more than 50%, preferably 52-53%.

In stage (ii) of the polymerization process the product of stage (i) is subjected to further polymerization in one or more reactors for obtaining the elastomeric propylene copolymer of the heterophasic propylene copolymer of the invention.

The polymerization of stage (ii) is carried out as a gas-phase polymerization in one or more gas-phase reactors. It is particularly preferred that the polymerization of stage (ii) is carried out in one gas-phase reactor to which the product of stage (i) is fed together with propylene, comonomer, and hydrogen as needed.

As mentioned earlier, the comonomer is at least one olefin selected from the group of consisting of ethylene and $C_4$-$C_{10}$-$\alpha$-olefins, such as ethylene, butene, pentene, hexane and the like, and preferably ethylene.

The elastomeric propylene copolymer of stage (ii) will give the heterophasic propylene copolymer improved impact strength. The conditions for the copolymerization are within the limits of conventional ethylene-propylene rubber (EPM) production conditions such as they are disclosed e.g. in Encyclopedia of Polymer Science and Engineering, Second Edition. Vol. 6, p. 545-558. A rubbery product is formed if the comonomer (preferably ethylene) content in the polymer lies within a certain range. Thus, preferably, ethylene and propylene are copolymerized into an elastomer in such a ratio that the amorphous part of the copolymer contains from 10 to 70% by weight of ethylene units.

It is desired that the elastomeric propylene copolymer of stage (ii) and thus also the overall heterophasic propylene copolymer should have a low amount of "rubber", i.e. that the XS value should be low in order not to adversely affect the targeted high modulus of the heterophasic propylene copolymer. On the other hand the amount of rubber, expressed as the XS value, should not be too low, but sufficient to afford the polymer sufficient impact strength. Therefore, the XS of the ethylene-propylene impact copolymer should lie in the range 4-10% by weight, preferably 6-8% by weight, based on the weight of the ethylene-propylene impact copolymer.

The desired low XS means that in stage (ii) of the polymerization process a relatively low proportion of elastomeric ethylene-propylene copolymer having a low content of ethylene should be produced. Stable polymerization of such a low proportion, low ethylene content elastomeric ethylene-propylene copolymer is generally considered difficult. However, the present invention deals with this problem by carrying out the stage (ii) polymerization at a low catalyst activity. The low catalyst activity in stage (ii) is achieved by increasing the temperature in stage (i), thereby increasing the catalyst activity in stage (i) and accordingly decreasing it in stage (ii). The catalyst activity in stage (ii) is further decreased by lowering the temperature of stage (ii). Thus, the temperature at the polymerization in stage (ii) should be 40-90° C., and more preferably 60-70° C. The pressure at the polymerization in stage (ii) should be 500-3000 kPa, preferably 1000-2000 kPa.

The ethylene partial pressure in stage (ii) should be sufficient to give a comonomer, i.e. preferably ethylene content of 2-7% by weight, preferably 3-4% by weight, based on the weight of the heterophasic propylene copolymer.

In addition to the heterophasic propylene copolymer the base polymer composition according to the present invention may comprise conventional adjuvants, such as additives, fillers and reinforcing agents.

As examples of additives may be mentioned nucleating agents, process and heat stabilizers, pigments and other colouring agents including carbon black. Depending on the type of additive additives may generally be included in amounts of 0.01-5% by weight.

Thus, preferably, the polymer composition includes 0.05-3% by weight of one or more α-nucleating agents, such as talc, polymerized vinyl compounds such as poly-vinyl cyclohexane (poly-VCH), dibenzylidene sorbitol (DBS), sodium benzoate, and di(alkylbenzylidene)sorbitol. α-Nucleating agents give rise to a higher tensile modulus and thus a higher stiffness of the polymer composition. Except for talc, the α-nucleating agents are usually added in small amounts of 0.0001-1% by weight, preferably 0.001-0.7% by weight. Talc is a specific case as it may be added both as a nucleating agent and as a filler. When added as a nucleating agent talc is added in an amount of 0.05-3% by weight, preferably 0.1-2% by weight.

As examples of fillers may be mentioned e.g. talc, mica, calcium carbonate, kaolin and clay. Generally, fillers are added in an amount of from more than 3 to 60% by weight. Specifically, talc is preferably added in an amount of from more than 3 to 30% by weight, calcium carbonate in amount of 10-50% by weight, and kaolin and clay in an amount of 10-50% by weight.

The incorporation of filler in the polymer increases the stiffness, i.e. increases the elasticity modulus calculated from ring stiffness. Thus, an addition of 10% by weight of talc increases the elasticity modulus by about 1000 MPa; an addition of 20% by weight of talc increases the elasticity modulus by about 1400 MPa; and an addition of 25% by weight of talc increases the elasticity modulus by about 1800 MPa. Consequently, if the base polymer (i.e. the polymer composition as such with no adjuvants except for process and heat stabilization agents) according to the invention has a elasticity modulus of at least 1800 MPa, this is increased to about 2300-2500 MPa by the addition of 10% by weight of talc. Correspondingly, addition of 20% by weight of talc increases the tensile modulus to about 3000-3200 MPa, and 30% by weight of talc gives a tensile modulus of about 3700-3800 MPa.

As examples of suitable reinforcing agents may be mentioned fibers, such as chopped or continuous glass fibres, carbon fibres, steel fibres and cellulose fibres. Generally, fibers are added in an amount of 5-80% by weight, preferably 10-50% by weight, and more preferably 15-40% by weight.

The adjuvants may be incorporated into the polymer composition by methods known per se, e.g. by mixing the polymer components with the adjuvants in the desired weight relationship using a batch or a continuous process. As examples of typical batch mixers the Banbury and the heated roll mill can be mentioned. Continuous mixers are exemplified by the Farrel mixer, the Buss co-kneader, and single- or twin-screw extruders.

Generally, polymer pipes are manufactured by extrusion, or, to a smaller extent, by injection moulding. A conventional plant for screw extrusion of polymer pipes comprises a single or double screw extruder, a nozzle, a calibrating device, cooling equipment, a pulling device, and a device for cutting or for coiling-up the pipe. The polymer is extruded into a pipe from the extruder. This process step requires that the pipe has sufficient melt strength so that the pipe does not collapse. This screw extrusion technique is well known to the skilled person and no further particulars should therefore be necessary here concerning this aspect.

Having thus described the present invention it will now be illustrated by way of non-limiting examples of preferred embodiments in order to facilitate the under-standing of the invention.

In the examples the heterophasic propylene copolymer compositions of the invention were prepared according to the preferred embodiment described above by polymerization in a pilot plant apparatus of a propylene homopolymer matrix in stage (i) comprising prepolymerization in a prepolymerization reactor, polymerization in a first step in a loop reactor, and polymerization in a second step in a gas-phase reactor (GPR1); and subsequently polymerization in stage (ii) of an elastomeric ethylene-propylene copolymer in a gas-phase reactor (GPR2). The heterophasic propylene copolymer compositions obtained were then pelletized and made into 110 mm outside diameter (OD), 4 mm wall thickness, smooth pipes by extrusion in a per se known manner. The composition contained about 0.8% by weight of heat and process stabilizers.

In the examples the polymerization conditions and the properties of the polymers and pipes obtained are given.

Example 1-3

In these examples the polymerization conditions in the loop reactor and GPR1, i.e. for the polymerization of the propylene homopolymer matrix, were about the same. For the polymerization of the elastomeric ethylene-propylene copolymer in GPR2 the polymerization temperature was maintained at 70.0° C. in both Example 1 and 2, but the propylene partial pressure was increased in Example 2. In Example 3 the polymerization temperature in GPR2 was lowered to 60.0° C.

Particulars regarding the polymerization conditions are given in Table 1. In Table 2 results are given from tests of the polymers and pipes obtained in Examples 1-3.

TABLE 1

Polymerization conditions and polymer properties

|  | Ex. 1 | Ex. 2 | Ex. 3 |
|---|---|---|---|
| Stage (i) Loop |  |  |  |
| Temp (° C.) | 80.0 | 80.0 | 80.0 |
| Pressure (kPa) | 5500 | 5500 | 5500 |
| Split (%) | 50.2 | 50.3 | 48.6 |
| MFR (10/230) (g/10 min) | 0.61 | 0.8 | 0.83 |
| GPR1 |  |  |  |
| Temp (° C.) | 85.0 | 85.0 | 85.0 |
| Pressure (kPa) | 2050 | 2050 | 2050 |
| Split (%) | 49.8 | 49.7 | 51.4 |
| MFR (2/230) (g/10 min) | 0.34 | 0.37 | 0.33 |
| Stage (ii) GPR2 |  |  |  |
| Temp (° C.) | 70.0 | 70.0 | 60.0 |
| Propylene partial pressure (kPa) | 413 | 551 | 456 |
| MFR (2/230) (g/10 min) | 0.31 | 0.31 | 0.30 |
| XS (%) | 6.3 | 6.2 | 7.0 |
| AM (%) | 6.3 | 5.5 | 5.8 |
| Total ethylene (%) | 3 | 3.1 | 3.0 |
| $SHI_{0/50}$ | 16 | 15 | 12 |

TABLE 2

Polymer/Pipe properties

|  | Ex. 1 | Ex. 2 | Ex. 3 |
|---|---|---|---|
| Inner diameter, $D_i$ (mm) | 101.80 | 101.85 | 101.96 |
| Wall thickness, t (mm) | 4.458 | 4.173 | 4.122 |
| Ring stiffness, S (N/m²)[1] | 11250 | 10420 | 9448 |
| E modulus, E (MPa)[2] | 1800 | 2050 | 1930 |
| E modulus, E (MPa)[3] | 1930 | 1880 | 1870 |
| Impact strength, Charpy (ISO 179/1eA) |  |  |  |
| 0° C. (kJ/m²) | 6.4 | 6.4 | 7.8 |
| −20° C. (kJ/m²) | 4 | 4 | 4.3 |
| Impact strength, $H_{50}$ (EN1411, OD 110 mm, −20° C.) (m) | 3.9 | 3.9 | >4.0 |
| Pipe pressure resistance, (EN921, OD 110 mm; hrs/failure mode[4]) |  |  |  |
| 80° C., 4.2 MPa | 1013/I | 708/I | 1218/I |
| 95° C., 2.5 MPa | 1680/1680/I/I | 1700/1700/I/I | 1700/1700/I/I |

[1] Measurements made on test pieces 21 ± 2 days after extrusion
[2] Calculated value according to formula (I)
[3] According to ISO 527
[4] R = Running; B = Break; I = Interrupted From the results in Table 2 it is evident that the pipes according to the invention have a very high elasticity modulus or stiffness of about 1800 MPa or more combined with a high impact resistance at low temperatures and a high pipe pressure resistance, i.e. a high resistance to slow crack growth.

ExampleS 4-5

In these examples the polymerization conditions for stage (ii) were about the same, while the polymerization of the propylene homopolymer matrix in the loop reactor was carried out at supercritical conditions.

The particulars regarding the polymerization conditions and polymer and pipe properties are given in Table 3 and Table 4, respectively.

TABLE 3

Polymerization conditions and polymer properties

|  | Ex. 4 | Ex. 5 |
|---|---|---|
| Stage (i) Loop |  |  |
| Temp (° C.) | 93.0 | 93.0 |
| Pressure (kPa) | 5500 | 5500 |
| Split (%) | 49.6 | 48.9 |
| MFR (10/230) (g/min) | 0.77 | 0.75 |
| GPR1 |  |  |
| Temp (° C.) | 85.0 | 85.0 |
| Pressure (kPa) | 2900 | 2900 |
| Split (%) | 50.4 | 51.1 |
| MFR (2/230) (g/10 min) | 0.27 | 0.28 |
| Stage (ii) GPR2 |  |  |
| Temp (° C.) | 70.0 | 70.0 |
| Propylene partial pressure (kPa) | 431 | 437 |
| MFR (2/230) (g/10 min) | 0.25 | 0.27 |
| XS (%) | 6.2 | 6.2 |
| AM (%) | 5.8 | 5.8 |
| Total ethylene (%) | 2.9 | 3.1 |
| $SHI_{0/50}$ | 11 | 12 |

TABLE 4

Polymer/Pipe properties

|  | Ex. 4 | Ex. 5 |
|---|---|---|
| Inner diameter, $D_i$ (mm) | 101.77 | 101.69 |
| Wall thickness, t (mm) | 4.215 | 4.253 |
| Ring stiffness, S (N/m²)[1] | 9885 | 10070 |
| E modulus, E (MPa)[2] | 1890 | 1870 |
| E modulus, E (MPa)[3] | 1850 | 1840 |
| Impact strength, Charpy (ISO 179/1eA) |  |  |
| 0° C. (kJ/m²) | 6.6 | 7.3 |
| −20° C. (kJ/m²) | 3.9 | 4.2 |
| Impact strength, $H_{50}$ (EN1411, OD 110 mm, −20° C.) (m) | 4.0 | >4.0 |
| Pipe pressure resistance, (EN921, OD 110 mm; hrs/failure mode[4]) |  |  |
| 80° C., 4.2 MPa | 432/R | 432/R |
| 95° C., 2.5 MPa | 1700/1700/I/I | 1680/1680/I/I |

[1] Measurements made on test pieces 21 ± 2 days after extrusion
[2] Calculated value according to formula (I)
[3] According to ISO 527
[4] R = Running; B = Break; I = Interrupted From the results in Tables 3-4 it is evident that also in these examples pipes with a very desirable combination of properties, i.e. high elasticity modulus, high impact resistance, and high pipe pressure resistance, were obtained.

Examples 6-7

These examples illustrate the effect of addition of talc to the polymer composition of the invention.

The polymer composition of the pipe according to Example 6 was the same as that of Example 3, except for incorporation of 1% by weight of talc.

The polymer composition of Example 7 was made similarly to those of Examples 4-5. The polymerization conditions are given in Table 5. As in Example 6 1% by weight of talc was incorporated into the polymer composition of Example 7 by compounding before extruding the composition into a pipe.

The polymer and pipe properties are given in Table 6.

TABLE 5

Polymerization conditions and polymer properties

|  | Ex. 7 |
|---|---|
| Stage (i) Loop | |
| Temp (° C.) | 93.0 |
| Pressure (kPa) | 5500 |
| Split (%) | 48.5 |
| MFR (10/230) (g/min) | 0.65 |
| GPR1 | |
| Temp (° C.) | 85.0 |
| Pressure (kPa) | 2900 |
| Split (%) | 51.5 |
| MFR (2/230) (g/10 min) | 0.27 |
| Stage (ii) GPR2 | |
| Temp (° C.) | 70.0 |
| Propylene partial pressure (kPa) | 428 |
| MFR (2/230) (g/10 min) | 0.27 |
| XS (%) | 7.7 |
| AM (%) | 5.8 |
| Total ethylene (%) | 2.7 |
| $SHI_{0/50}$ | 12 |

TABLE 6

Polymer/Pipe properties

|  | Ex. 6 | Ex. 7 |
|---|---|---|
| Inner diameter, $D_i$ (mm) | 101.96 | 101.82 |
| Wall thickness, t (mm) | 4.222 | 4.242 |
| Ring stiffness, S $(N/m^2)$[1] | 10190 | 10210 |
| E modulus, E (MPa)[2] | 1940 | 1910 |
| E modulus, E (MPa)[3] | 1990 | 1940 |
| Impact strength, Charpy (ISO 179/1eA) | | |
| 0° C. $(kJ/m^2)$ | 8.3 | 7.8 |
| −20° C. $(kJ/m^2)$ | 4.9 | 4.6 |
| Impact strength, $H_{50}$ (EN1411, OD 110 mm, −20° C.) (m) | >4.0 | >4.0 |
| Pipe pressure resistance, (EN921, OD 110 mm; hrs/failure mode[4]) | | |
| 80° C., 4.2 MPa | 2304/2304/2280/R/R/R | 432/R |
| 95° C., 2.5 MPa | 2376/2376/2376/R/R/R | 1700/1700/I/I |

[1] Measurements made on test pieces 21 ± 2 days after extrusion
[2] Calculated value according to formula (I)
[3] According to ISO 527
[4] R = Running; B = Break; I = Interrupted From the results in Table 6 it is evident that the incorporation of a small amount of talc enhances the pipe properties and results in higher elasticity modulus, higher impact resistance, and higher pipe pressure resistance.

Comparative Examples 1-2

As a comparison pipes were made of prior art heterophasic propylene copolymer compositions and tested. The particulars of the compositions are given in Table 7.

TABLE 7

Polymerization conditions and polymer properties

|  | Comp. Ex. 1-2 |
|---|---|
| Stage (i) Loop | |
| Temp (° C.) | 80 |
| Pressure (kPa) | 5416 |
| Split (%) | 34 |
| MFR (10/230) (g/min) | 0.8 |
| GPR1 | |
| Temp (° C.) | 85 |
| Pressure (kPa) | 1975 |
| Split (%) | 66 |
| MFR (2/230) (g/10 min) | 0.30 |
| Stage (ii) GPR2 | |
| Temp (° C.) | 70 |
| Pressure (kPa) | 1185 |
| Propylene partial pressure (kPa) | 302 |
| MFR (2/230) (g/10 min) | 0.28 |
| XS (%) | 10.2 |
| AM (%) | 10.0 |
| Total ethylene (%) | 3.1 |
| $SHI_{0/50}$ | 13 |

Before extruding the compositions into pipes the composition of Comparative Example 2 was first compounded with 2.5% by weight of talc. The properties of the pipes according to Comparative Examples 1-2 are given in Table 8.

TABLE 8

Polymer/Pipe properties

|  | Comp. Ex. 1 | Comp. Ex. 2 |
|---|---|---|
| Inner diameter, $D_i$ (mm) | 101.71 | 101.71 |
| Wall thickness, t (mm) | 4.145 | 4.187 |
| Ring stiffness, S $(N/m^2)$[1] | 8389 | 9482 |
| E modulus, E (MPa)[2] | 1689 | 1770 |
| E modulus, E (MPa)[3] | 1760 | 1940 |
| Impact strength, $H_{50}$ (EN1411, OD 110 mm, −20° C.) (m) | >4.0 | >4.0 |
| Pipe pressure resistance, (EN921, OD 32 mm) | | |
| 80° C., 4.2 MPa hrs | 390/390/502 | 302/418/294 |
| failure mode | B/B/B | B/B/B |
| 95° C., 2.5 MPa hrs | 1210/1306/1118 (OD110) | 1280/1412/1143 |
| failure mode | B/B/B | B/B/B |

[1] Measurements made on test pieces 21 ± 2 days after extrusion
[2] Calculated value according to formula (I)
[3] According to ISO 527

It is evident from the results in Table 8 that the pipes of the prior art composition had a lower elasticity modulus than those of the present invention. Not even with incorporation of talc did the pipe of the prior art polymer composition achieve the very high elasticity modulus of the pipes according to the present invention.

The invention claimed is:

1. A pressureless polymer pipe, wherein the polymer pipe comprises a propylene polymer composition comprising a propylene base polymer, wherein the propylene base polymer is a heterophasic propylene copolymer having a matrix of a multimodal propylene homopolymer, wherein the multimodal propylene homopolymer is produced in two or more reactors in series in the presence of different concentrations of hydrogen, and a dispersed phase of an elastomeric copolymer of propylene and at least one olefin comonomer;

has a comonomer content of 2-7% by weight, based on the weight of the heterophasic propylene copolymer;

has a melt flow rate MFR (2/230), determined according to ISO 1133 C4, of 0.1-2.0 g/10 min;

has a broad molecular weight distribution as defined by its rheology shear thinning index, $SHI_{0/50}$, measured at 200° C. of 9-30;

has a tensile modulus, determined according to ISO 527-2/1B at 1 mm/min and 23° C. of at least 1800 MPa;

has an impact strength, determined according to ISO 179/1 eA of at least 6 kJ/m² at 0° C. and at least 2 kJ/m² at −20° C.;

the propylene polymer composition comprises a nucleating agent;

the heterophasic propylene copolymer has a content of xylene soluble material (XS) of 4-10% by weight, and the pipe has an E modulus, calculated from the ring stiffness, determined according to EN ISO 9969 for a pipe having a diameter of 110 mm and a wall thickness of 4 mm at 23° C., of at least 1800 MPa, said calculation being made according to formula (I):

$$E = \text{Ring stiffness} \times 12 \times [(D-t)/t]^3 \quad (I)$$

where

E is the elasticity modulus in MPa,

D is the outer diameter of the pipe in mm, and t is the wall thickness of the pipe in mm.

2. The pipe according to claim 1, wherein the olefin comonomer is at least one olefin selected from the group of consisting of ethylene and $C_4$-$C_{10}$-α-olefins.

3. The pipe according to claim 1, wherein the comonomer is ethylene.

4. The pipe according to claim 1, wherein the propylene polymer composition comprises adjuvants selected from additives, fillers and reinforcing agents.

5. The pipe according to claim 4, wherein the composition comprises talc in an amount of up to 30% by weight.

6. The pipe according to claim 1, wherein the propylene base polymer has a tensile modulus of up to 2500 MPa.

7. The pipe according to claim 1, wherein the heterophasic propylene copolymer has a melt flow rate MFR (2/230) of 0.2-0.5 g/10 min.

8. The pipe according to claim 1, wherein the pipe has a pipe pressure resistance, determined according to EN 921 in water conditions on a pipe with 32 mm/3.0 mm or 110 mm/4.0 mm outer diameter/wall thickness, of more than 200 hrs at 4.2 MPa/80° C. and more than 1500 hrs at 2.5 MPa/95° C.

9. A propylene polymer composition for a pressureless polymer pipe, wherein the propylene polymer composition comprises a propylene base polymer and the propylene base polymer is a heterophasic propylene copolymer comprising a matrix of a multimodal propylene homopolymer, wherein the multimodal propylene homopolymer is produced in two or more reactors in series in the presence of different concentrations of hydrogen, and a dispersed phase of an elastomeric copolymer of propylene and at least one olefin comonomer;

has a comonomer content of 2-7% by weight, based on the weight of the heterophasic propylene copolymer;

has a melt flow rate MFR (2/230), determined according to ISO 1133 C4, of 0.1-2.0 g/10 min;

has a broad molecular weight distribution as defined by its rheology shear thinning index, $SHI_{0/50}$, measured at 200° C. of 9-30;

has a tensile modulus, determined according to ISO 527-2/1B at 1 mm/min and 23° C. of at least 1800 MPa;

has an impact strength, determined according to ISO 179/1 eA of at least 6 kJ/m² at 0° C. and at least 2 kJ/m² at −20° C.;

the propylene polymer composition comprises a nucleating agent, and the heterophasic propylene copolymer has a content of xylene soluble material (XS) of 4-10% by weight.

10. The composition according to claim 9, wherein the olefin comonomer is at least one olefin selected from the group consisting of ethylene and $C_4$-$C_{10}$-α-olefins.

11. The composition according to claim 9, wherein the olefin comonomer is ethylene.

12. The composition according to claim 9, wherein the composition includes adjuvants selected from the group consisting of additives, fillers and reinforcing agents.

13. The composition according to claim 9, wherein the heterophasic propylene copolymer has a melt flow rate MFR (2/230) of 0.2-0.5 g/10 min.

14. A process of preparing a polymer composition for a pressureless polymer pipe according to claim 9, wherein the process comprises polymerizing in the presence of a stereospecific Ziegler-Natta catalyst including an electron donor:

(i) a propylene homopolymer matrix in at least one loop reactor at a temperature of at least 80° C. and a pressure of 4600-10000 kPa and at least one other reactor in series wherein the loop reactor and the at least one other reacter are provided having different concentrations of hydrogen to produce a multimodal propylene homopolymer; and (ii) an elastomeric copolymer of propylene and at least one olefin comonomer in at least one gas-phase reactor at a lower temperature than in stage (i);

to obtain a base polymer of heterophasic propylene copolymer comprising a matrix of a multimodal propylene homopolymer, and a dispersed phase of said elastomeric propylene copolymer; said heterophasic propylene copolymer having a comonomer content of 2-7% by weight, based on the weight of the heterophasic propylene copolymer;

a melt flow rate MFR (2/230), determined according to ISO 1133 C4, of 0.1-2.0 g/10 min;

a broad molecular weight distribution as defined by its rheology shear thinning index, $SHI0_{0/50}$, measured at 200° C. of 9-30;

a tensile modulus, determined according to ISO 527-2/1B at 1 mm/min and 23° C. of at least 1800 MPa;

an impact strength, determined according to ISO 179/1 eA of at least 6 kJ/m² at 0° C. and at least 2 kJ/m² at −20° C.; and a content of xylene soluble material (XS) of 4-10% by weight;

and the propylene polymer composition comprises a nucleating agent.

15. The process according to claim 14, wherein said at least one olefin comonomer is selected from the group consisting of ethylene and $C_4$-$C_{10}$-α-olefins.

16. The process according to claim 14, wherein the olefin comonomer is ethylene.

17. The process according to claim 14, wherein stage (i) comprises polymerizations in a loop reactor and a gas-phase reactor.

18. The process according to claim 14, wherein the polymerization in the loop reactor is carried out at supercritical conditions.

19. The process according to claim 18, wherein the polymerization in the loop reactor is carried out at a temperature of 92-100° C. and a pressure of 4600-10000 kPa.

20. The process according to claim 14, wherein the polymerization in stage (ii) is carried out at a temperature of 40-90° C. and a pressure of 500-3000 kPa.

21. The process according to claim 17, wherein the polymerization in the gas-phase reactor of stage (i) is carried out at a temperature of 50-115° C. and a pressure of 500-5000 kPa.

* * * * *